United States Patent
Josse et al.

(10) Patent No.: US 11,613,484 B2
(45) Date of Patent: Mar. 28, 2023

(54) ORGANICS RECOVERY FROM DRY FRACTION

(71) Applicant: ANAERGIA INC., Burlington (CA)

(72) Inventors: Juan Carlos Josse, Mission Viejo, CA (US); Andrew Benedek, Rancho Santa Fe, CA (US); Yaniv D. Scherson, Carlsbad, CA (US)

(73) Assignee: ANAERGIA INC., Burlington (CA)

( * ) Notice: Subject to any disclaimer, the term of this patent is extended or adjusted under 35 U.S.C. 154(b) by 556 days.

(21) Appl. No.: 15/167,324

(22) Filed: May 27, 2016

(65) Prior Publication Data

US 2016/0346788 A1 Dec. 1, 2016

Related U.S. Application Data

(60) Provisional application No. 62/168,378, filed on May 29, 2015.

(51) Int. Cl.
  *B02C 21/00* (2006.01)
  *B02C 13/00* (2006.01)
  (Continued)

(52) U.S. Cl.
  CPC ............ *C02F 11/122* (2013.01); *B02C 13/00* (2013.01); *B02C 21/00* (2013.01); *B03B 9/061* (2013.01);
  (Continued)

(58) Field of Classification Search
  CPC ... B02C 13/14; B02C 2201/063; B02C 21/00; B02C 2201/06; B02C 2201/066;
  (Continued)

(56) References Cited

U.S. PATENT DOCUMENTS 2,922,589 A * 1/1960 Sheldon .................. B02C 13/14
  209/139.1
3,616,660 A * 11/1971 Ingermarsson ........ B01D 33/72
  68/22 R (Continued)

FOREIGN PATENT DOCUMENTS

CN  1623693 A  6/2005
CN  101658854 A  3/2010

(Continued)

OTHER PUBLICATIONS

United Kingdom Patent Application No. 1609511.9, Combined Examination and Search Report dated Nov. 30, 2016.

(Continued)

*Primary Examiner* — John P Go
*Assistant Examiner* — Christopher B Wehrly
(74) *Attorney, Agent, or Firm* — Borden Ladner Gervais LLP; Michael Damiani

(57) ABSTRACT

Solid waste, for example source separated organics (SSO) or commercial and industrial (C&I) waste or both, are treated by first pressurizing the waste against a screen to produce a solids fraction and a liquid fraction. The liquid fraction can be treated in an anaerobic digester. The solids fraction is pulverized or milled, for example with a hammer mill, preferably after being diluted. The pulverized or milled waste is separated again to provide a second solids faction and a second liquid fraction. The liquid fraction can be treated in an anaerobic digester. The solids fraction is primarily inert and can be landfilled, preferably after being washed.

8 Claims, 2 Drawing Sheets

(51) Int. Cl.
  *B30B 9/02* (2006.01)
  *C05F 9/04* (2006.01)
  *C05F 7/00* (2006.01)
  *C02F 11/122* (2019.01)
  *C02F 3/28* (2006.01)
  *B30B 9/12* (2006.01)
  *C02F 11/04* (2006.01)
  *C02F 11/125* (2019.01)
  *B03B 9/06* (2006.01)

(52) U.S. Cl.
  CPC ............... *B30B 9/02* (2013.01); *B30B 9/12* (2013.01); *C02F 3/28* (2013.01); *C02F 11/04* (2013.01); *C02F 11/125* (2013.01); *C05F 7/00* (2013.01); *C05F 9/04* (2013.01); *B02C 2201/063* (2013.01); *Y02A 40/20* (2018.01); *Y02P 20/145* (2015.11); *Y02W 30/40* (2015.05)

(58) Field of Classification Search
  CPC ........... B02C 23/08–14; B02C 17/007; B02C 18/0084; B02C 18/0092; B02C 23/20; B30B 9/04; B30B 9/20; B30B 9/301; B30B 9/3014; B30B 9/02–267; B03B 9/06; Y02W 30/47; Y02W 30/20; Y02W 30/40; Y02W 30/43; C02F 11/121–128; C02F 11/32–327
  USPC ................... 100/110, 215, 37, 131
  See application file for complete search history.

(56) References Cited

U.S. PATENT DOCUMENTS

| | | | | |
|---|---|---|---|---|
| 5,143,628 | A | * | 9/1992 | Bott .................... B01D 29/824 100/122 |
| 2003/0121851 | A1 | * | 7/2003 | Lee, Jr. ................. C12M 45/04 210/603 |
| 2004/0168960 | A1 | * | 9/2004 | Holtzapple .......... C05F 17/986 210/101 |
| 2012/0325421 | A1 | * | 12/2012 | Li ............................ C05F 7/02 162/189 |
| 2014/0101991 | A1 | * | 4/2014 | Aharon .................... C12P 7/10 44/589 |
| 2015/0167022 | A1 | * | 6/2015 | Jensen .................... B09B 5/00 435/167 |

FOREIGN PATENT DOCUMENTS

| | | | |
|---|---|---|---|
| EP | 0893652 A1 | 1/1999 | |
| MD | 51 Y | 7/2009 | |
| WO | WO-2013091094 A1 * | 6/2013 | ............. C05F 17/50 |
| WO | 2016174609 A1 | 11/2016 | |

OTHER PUBLICATIONS

United Kingdom Patent Application No. 1609511.9, Office Action dated Dec. 20, 2018.
United Kingdom Patent Application No. 1609511.9, Examination Report dated Sep. 25, 2018.

* cited by examiner

ORGANICS RECOVERY FROM DRY FRACTION

CROSS-REFERENCE TO RELATED APPLICATIONS

This application claims the benefit of U.S. Application Ser. No. 62/168,378, filed May 29, 2015, which is incorporated herein by reference.

BACKGROUND

Hammer mills can be used to process organic waste such as source separated organics (SSO). However, SSO typically has a solids content of 20-30%, and must be diluted to about 10% for processing in the hammer mill. The dilution lowers the effective processing rate of the hammer mill.

SUMMARY

This specification describes including a step of low pressure extrusion or pressing of wet organic waste, typically residential source separated organics (SSO) and commercial and industrial (C&I) waste, and a step of milling or otherwise pulverizing solids of the waste. In this two-step process the waste is subjected to pressure in a confined compression or extrusion chamber with perforations, through which the "flowable" organics escape under pressure. The flowable organics, or recovered "wet fraction" constitute a very suitable feedstock for anaerobic digestion. The "non-flowable" material or rejects are retained inside the chamber. The retained portion is called the "dry fraction". The dry fraction undergoes the second processing step. In an example, the rejects are diluted, for example with the addition of water of digester filtrate, and hammer milled and screened to remove organics that may have remained in this fraction after the extrusion/pressing step. This two-step process increases throughput relative to hammer milling alone. The two step process might, in some cases, also increase organics recovery or minimizes power consumption or reduce cost.

An exemplary organics separation and recovery process is a two-step process where: (1) a press removes a majority of organics as wet fraction and generates a rejects dry fraction; (2) a hammer mill recovers residual organics that remained in the dry fraction. The coupled system may, in at least some cases, achieve higher throughput than the hammer mill alone and higher organics recovery than the press alone. The coupled system may, in at least some cases, provide comparable treatment at lower cost or energy consumption than either a hammer mill or press used alone.

DETAILED DESCRIPTION

Figure 1:
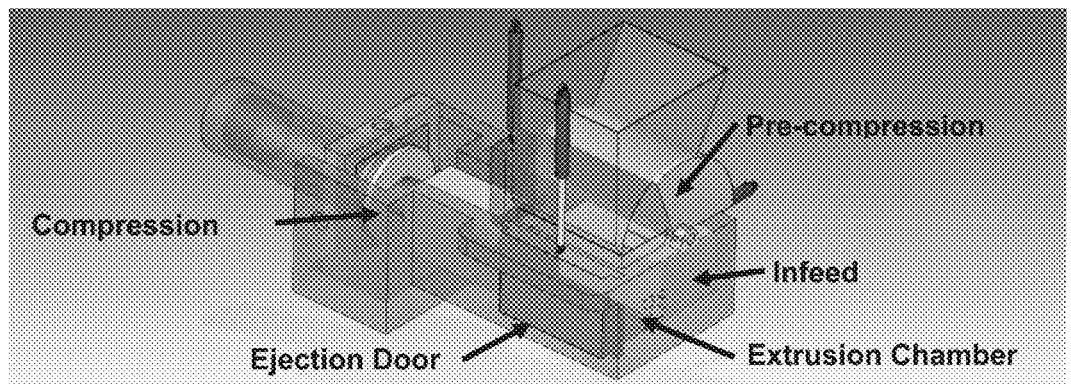
FIG. 1 is a schematic isometric view of a press.

A low pressure (50 to 180 bar or 80 to 180 bar or 120 to 180 bar or 80 to 120 bar) organics extrusion press (BIOREX) recovers organics from mixed solid waste streams by applying pressure to solid waste infeed placed in an extrusion chamber in order to extrude readily digestible putrescible organics through a perforated plate. A commercial press such as a press sold by VM Press or a press as shown in FIG. 1 may be used or adapted. The extruded organics are termed "wet fraction" and the material that remains in the extrusion chamber is termed "dry fraction". The wet fraction can be converted to renewable natural gas, electricity, and fertilizer through anaerobic digestion or composting. The dry fraction can be landfilled, recycled, or further processed to a renewable solid fuel. The infeed material can include wet commercial waste, commercial and industrial waste (C&I), and source separated organics (SSO). Varying processes for pre-sorting are possible, and in many cases encouraged, to remove large objects if present in the waste stream, that could obstruct the extrusion press liberate waste from bags, recovery recyclable materials, homogenize the waste stream, and concentrate organics. Other pressing processes have been described for mixed municipal solid waste, where higher pressures (i.e. 150 to 220 bar) are applied to extract organics. In MSW approximately 30 to 50% of the material fed to the press is recovered as wet fraction for anaerobic digestion. Pressures in excess of 150 bar are used to extract organics form these waste streams. In SSO and C&I waste the wet fraction can be 70 to 90 or 95%, meaning that there are less rejects and lower pressure is required to recover the organics.

After SSO or C&I waste extrusion at low pressure, the majority of the organics present in the incoming waste are removed as wet fraction, yet, a minority fraction of organics remain in the dry fraction. The quantity of residual organics remaining in the dry fraction depends on a number of variables including, in part, the waste composition, the bulk density of the infeed, the dimensions and geometry of the extrusion chamber, and the pressure applied to the infeed. Generally, high pressure extrusion removes a larger fraction of organics from the infeed than lower pressure extrusion. For example, the low pressure extrusion is optimal for feedstocks with high fractions of food or organic waste such as SSO and packaged food waste; whereas, high pressure extrusion is optimal for dense waste streams with higher non-organic or non-readily biodegradable fractions such as residential MSW or some commercial waste streams.

The residual organics remaining in the dry fraction can be recovered through milling and washing. Here, the dry fraction is milled under high force shearing, hammering, or pulverizing in order to dislodge material and separate residual organics from the dry fraction.

Figure 2:
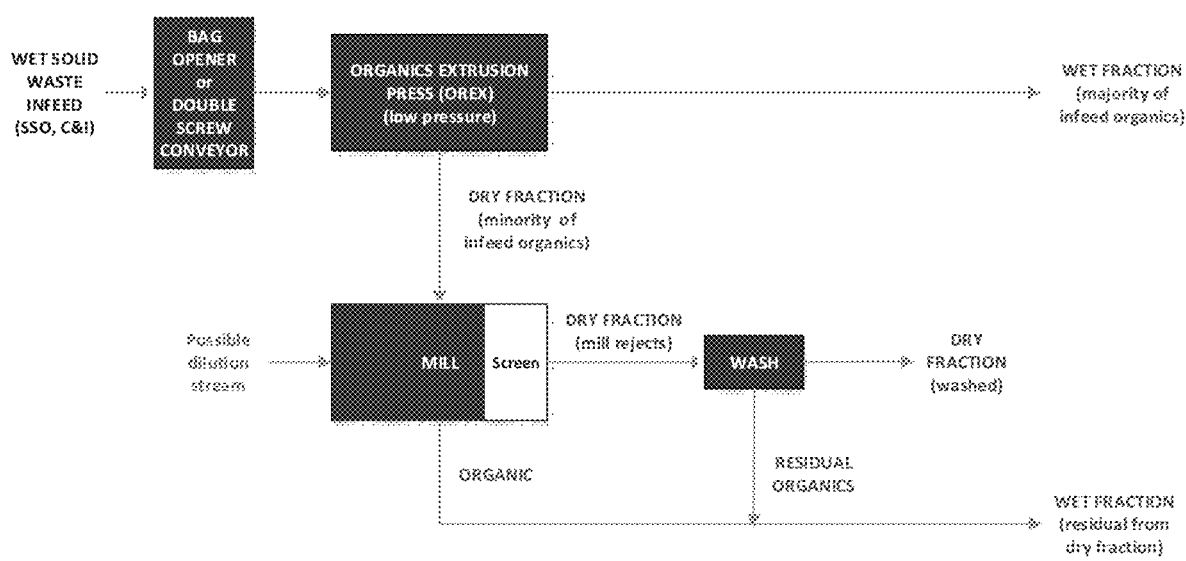
FIG. 2 is a process flow diagram of a first system and process.
Figure 3:
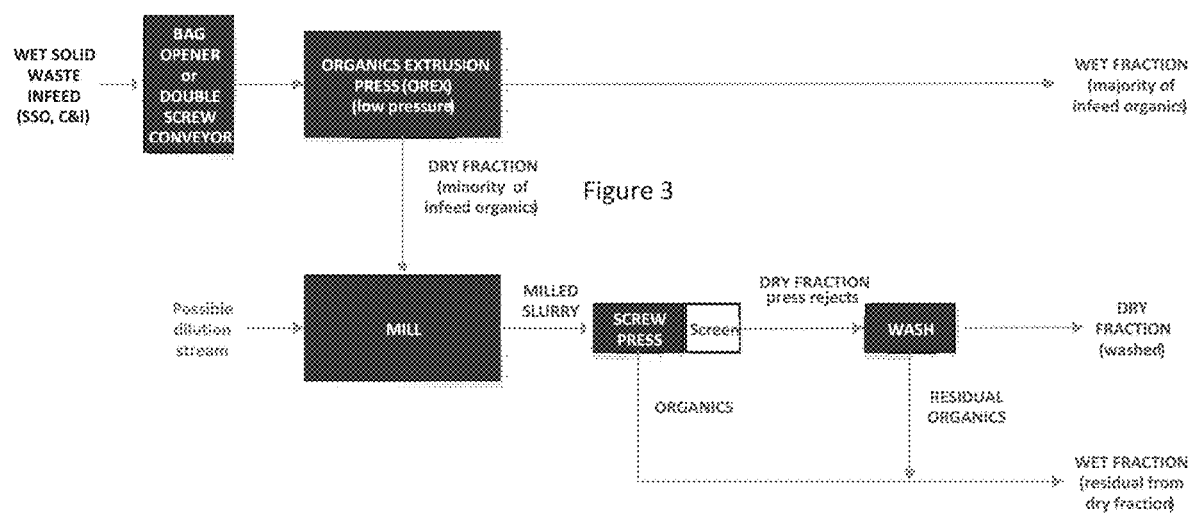
FIG. 3 is a process flow diagram of a second system and process.

For example, a hammer mill can violently dislodge organics bound to dry fraction and break large organic pieces into small particles and even a slurry. In some cases, the mill requires dilution of the dry fraction to 10-20% total solids content; the dry fraction is typically generated with 40-60% total solids content. The organics can be recovered separated from the dry fraction by a screen that retains the dry fraction and permits the passage of organics driven by the hammering or other shearing force (FIG. 2). Alternatively, the pulverized mixture of organics and dry fraction can pass through the mill and into a screw press that separates the organic slurry and water from the dry fraction through a screen and under relatively low pressure (FIG. 3). In either case, the retained dry fraction is washed to remove organic films and residual organics. The residual organics extracted by the mill and the dry fraction wash water are combined and amended to the bulk flow of wet fraction generated by the extrusion press. The combined flow from organics removed by the mill and the wash water from cleaning the dry fraction is a minority fraction of the bulk flow of wet fraction from the extrusion press; the combined stream continues downstream to further processing to remove small residual inert contaminants for use in an anaerobic digester or composting.

The combined low pressure system may be used to process waste streams with high organic fractions such as SSO and C&I and removes the vast majority of organics larger throughput at a similar treatment level than extrusion or milling alone. In at least some cases, the combined system can achieve near complete removal of organics. A system has the highest capacity unit process upstream, and cascades to one or more lower capacity unit processes for the dry fraction. Organics extraction begins with the highest capacity unit process, low pressure extrusion, which removes over 80% or over 90% of the organics and generates a small dry fraction. The dry fraction is then introduced into a lower capacity unit process such as a hammer mill, where residual organics are removed.

In the configurations described below and shown in FIGS. 2 and 3, SSO or C&I pass through a bag opener or double screw conveyor to liberate the contents of bags and to dislodge material. Then, the waste enters a press where low pressure extrusion separates a majority of the organics. Dry fraction from the press enters a mill where hammering or vigorous shearing dislodges and pulverizes material. The mill may require dilution of the dry fraction stream. Residual organics in the dry fraction can be separated in the mill through perforations in the mill itself (configuration 1), or by a downstream screw press or other separation process (configuration 2). The dry fraction exits either the mill or the screw press as a reject stream where it enters, for example, a drum washer for washing. Here trace residual organics are removed. The wash water stream and the organics extracted by the mill or screw press can be combined with the wet fraction generated by the low pressure extrusion press and treated, for example by anaerobic digestion.

In a first system and process, as shown in FIG. 2, dry fraction is milled where organics are extracted through perforations on a plate while hammered, and dry fraction rejects are discharged and polished in a wash to remove residual organics.

In a second system and process, as shown in FIG. 3, dry fraction is milled, and milled slurry is transferred to a screw press or other separation device to extract residual organics from the dry fraction. Dry fraction is discharged as press rejects and washed for final removal of trace organics.

Recovering organics from the dry fraction can increase yield to the anaerobic digester, reduce contamination of landfill with animal by-products, or both, relative to using a press alone.

We claim:

1. A method of treating solid waste including organic material, the method comprising steps of,
   a) extruding or pressing the waste to separate a dry fraction from a wet fraction;
   b) diluting the dry fraction with water of digester filtrate;
   c) pulverizing or milling the diluted dry fraction, and separating the pulverized or milled diluted dry fraction into (i) a liquid fraction that includes residual organics and (ii) dry fraction rejects by passing the pulverized or milled diluted dry fraction to a screen that retains the dry fraction rejects and permits the passage of the liquid fraction while or after pulverizing or milling the diluted dry fraction; and
   d) washing the separated dry fraction rejects to remove organic film or organics.

2. The method of claim 1 wherein the wet fraction is treated in an anaerobic digester.

3. The method of claim 1 wherein the residual organics are treated in an anaerobic digester.

4. The method of claim 1 wherein wash water produced from washing the dry fraction rejects is treated by anaerobic digestion.

5. The method of claim 1, wherein extruding or pressing the waste is performed at a pressure from 50 to 180 bar.

6. The method of claim 1, wherein the wet fraction comprises over 80% of the organic material.

7. The method of claim 6, wherein the wet fraction comprises over 90% of the organic material.

8. The method of claim 1, wherein the solid waste is: source separated organics, commercial waste, industrial waste, or any combination thereof.

* * * * *